(12) United States Patent
Chang et al.

(10) Patent No.: US 8,912,483 B2
(45) Date of Patent: Dec. 16, 2014

(54) DISPLAY MEASURING DEVICE

(71) Applicant: Industrial Technology Research Institute, Hsinchu (TW)

(72) Inventors: Yu-Shan Chang, Taichung (TW);
Sen-Yih Chou, Hsinchu (TW);
Chia-Hung Cho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 107 days.

(21) Appl. No.: 13/874,290

(22) Filed: Apr. 30, 2013

(65) Prior Publication Data

US 2014/0175270 A1    Jun. 26, 2014

(30) Foreign Application Priority Data

Dec. 26, 2012 (TW) .............................. 101150033 A

(51) Int. Cl.
*G01J 1/04*        (2006.01)

(52) U.S. Cl.
CPC ................... *G01J 1/0411* (2013.01)
USPC ....................................................... 250/236

(58) Field of Classification Search
USPC ................. 250/236, 559.19, 559.29
See application file for complete search history.

(56) References Cited

U.S. PATENT DOCUMENTS

| | | | |
|---|---|---|---|
| 5,764,209 A | 6/1998 | Hawthorne et al. | |
| 6,020,937 A * | 2/2000 | Bardmesser | 348/756 |
| 7,943,896 B1 * | 5/2011 | Keithley | 250/230 |
| 8,237,103 B1 * | 8/2012 | Keithley | 250/230 |
| 2009/0303315 A1 | 12/2009 | Charlesworth | |
| 2012/0038780 A1 | 2/2012 | Jeon et al. | |

FOREIGN PATENT DOCUMENTS

| | | |
|---|---|---|
| CN | 101482693 | 7/2009 |
| CN | 101836432 | 9/2010 |
| CN | 101943852 | 1/2011 |
| CN | 202617287 | 12/2012 |
| TW | 200700799 | 1/2007 |
| TW | 200827922 | 7/2008 |
| TW | 201101803 | 1/2011 |

OTHER PUBLICATIONS

Taiwan Patent Office, Office Action, Patent Application Serial No. 101150033, Sep. 18, 2014, Taiwan.
Woodgate et al., "Autostereoscopic 3D Display Systems With Observer Tracking", Signal Processing: Image Communication, Nov. 1998, pp. 131-145, vol. 14, Elsevier Science B.V., United Kingdom.

(Continued)

*Primary Examiner* — Seung C Sohn

(57) ABSTRACT

A display measuring device for measuring a display, includes a photosensitive unit, a first rotation plane mirror, a second rotation plane mirror, a first lens module, a second lens module, and an optic reflecting unit. The first lens module projects a first incident image from the display to the first rotation plane mirror. The first rotation plane mirror reflects the projected first incident image from the first lens module to the optic reflecting unit. The second lens module projects a second incident image from the display to the second rotation plane mirror. The second rotation plane mirror reflects the projected second incident image from the second lens module to the optic reflecting unit. The optic reflecting unit reflects the reflected first incident image to the photosensitive unit, and reflects the reflected second incident image to the photosensitive unit.

11 Claims, 3 Drawing Sheets

(56) References Cited

OTHER PUBLICATIONS

Dodgson, Neil A., "Autostereoscopic 3D Displays," Cover Feature, Aug. 2005, pp. 31-36, IEEE Computer Society, US.

Leroux et al., "Characterization of Auto-Stereoscopic and Polarization Based 3D Displays: A Common Approach", IMID 2009 Digest, Oct. 2009, Korea.

Watt et al., "Focus Cues Affect Perceived Depth", Journal of Vision, Dec. 15, 2005, pp. 834-862, vol. 5, ISSN, US.

Dodgson et al., "Multi-View Autostereoscopic 3D Display", IEEE Computer, vol. 38, 1999, United Kingdom.

Boher et al. "Passive Glass 3D Display Crosstalk Homogeneity Characterization", IDW '11, 2011, pp. 313-316, ITE and SID, US.

* cited by examiner

DISPLAY MEASURING DEVICE

CROSS REFERENCE TO RELATED APPLICATIONS

This Application claims priority of Taiwan Patent Application No. 101150033, filed on Dec. 26, 2012, the entirety of which is incorporated by reference herein.

TECHNICAL FIELD

The present invention relates to display measuring devices, and more particularly, relates to display measuring devices for measuring displays having a 3D display function.

BACKGROUND

Due to the conventional display is configured to show a plane image, the display measuring device for the conventional display has only a single lens and a sensor with a fixed measurement distance to measure chromaticity and luminance of the conventional displays. However, a 3D image is different from a plane image of a conventional display, wherein a 3D image needs two different images with parallax to make viewers feel the object depth variation of a 3D image. Thus, luminance or chromaticity of a same point on a 3D display observed by each eye of a viewer may be different.

In addition, as the distance between the user and the display changes, luminance or chromaticity of the same point on the 3D display observed by each eye of a viewer may be different. Therefore an improved display measuring device to measure displays with 3D image functions is needed.

SUMMARY

An embodiment of a display measuring device for a display having a 3D display function comprises a photosensitive unit, a first rotation plane mirror, a second rotation plane mirror, a first lens module, a second lens module, and an optic reflecting unit. The first lens module is configured to project a first incident image from the display to the first rotation plane mirror. The second lens module is configured to project a second incident image from the display to the second rotation plane mirror. The first rotation plane mirror is configured to reflect the projected first incident image from the first lens module as the third incident image to the optic reflecting unit. The second rotation plane mirror is configured to reflect the projected second incident image from the second lens module as the fourth incident image to the optic reflecting unit. The optic reflecting unit is configured to reflect a third incident image and a fourth incident image to the photosensitive unit.

In an embodiment of a display measuring device, the optic reflecting unit is a third rotation plane mirror, reflecting the third incident image to the photosensitive unit during a first period, and reflecting the fourth incident image to the photosensitive unit during a second period.

In another embodiment of a display measuring device, the optic reflecting unit comprises a first fixed plane mirror configured to reflect the third incident image, and a second fixed plane mirror configured to reflect the fourth incident image, wherein the first fixed plane mirror reflects the third incident image to a first area of the photosensitive unit, and the second fixed plane mirror reflects the fourth incident image to a second area of the photosensitive unit.

In an embodiment of a display measuring device, the measuring distance between the first lens module and the display is the same as the measuring distance between the second lens module and the display.

In an embodiment of a display measuring device, wherein the first rotation plane mirror, the second rotation plane mirror and the third rotation plane mirror are arranged in a common straight line, and the first rotation plane mirror shifts a first distance along the common straight line when the first lens module rotates according to the measuring distance, and the second rotation plane mirror shifts a second distance along the common straight line when the second lens module rotates according to the measuring distance.

An embodiment of a display measuring device comprises one or more than one color filters arranged between the optic reflecting unit and the photosensitive unit. In an embodiment, the first lens module comprises a first image capturing lens and a first lens, and the first incident image is projected to the first rotation plane mirror via the first image capturing lens and the first lens. In an embodiment, the second lens module comprises a second image capturing lens and a second lens, and the second incident image is projected to the second rotation plane mirror via the second image capturing lens and the second lens. An embodiment of a display measuring device comprises a focus lens configured to focus the third incident image and the fourth incident image on the photosensitive unit.

DESCRIPTION OF EMBODIMENTS

The making and using of the embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the disclosure, and do not limit the scope of the disclosure.

Figure 1:
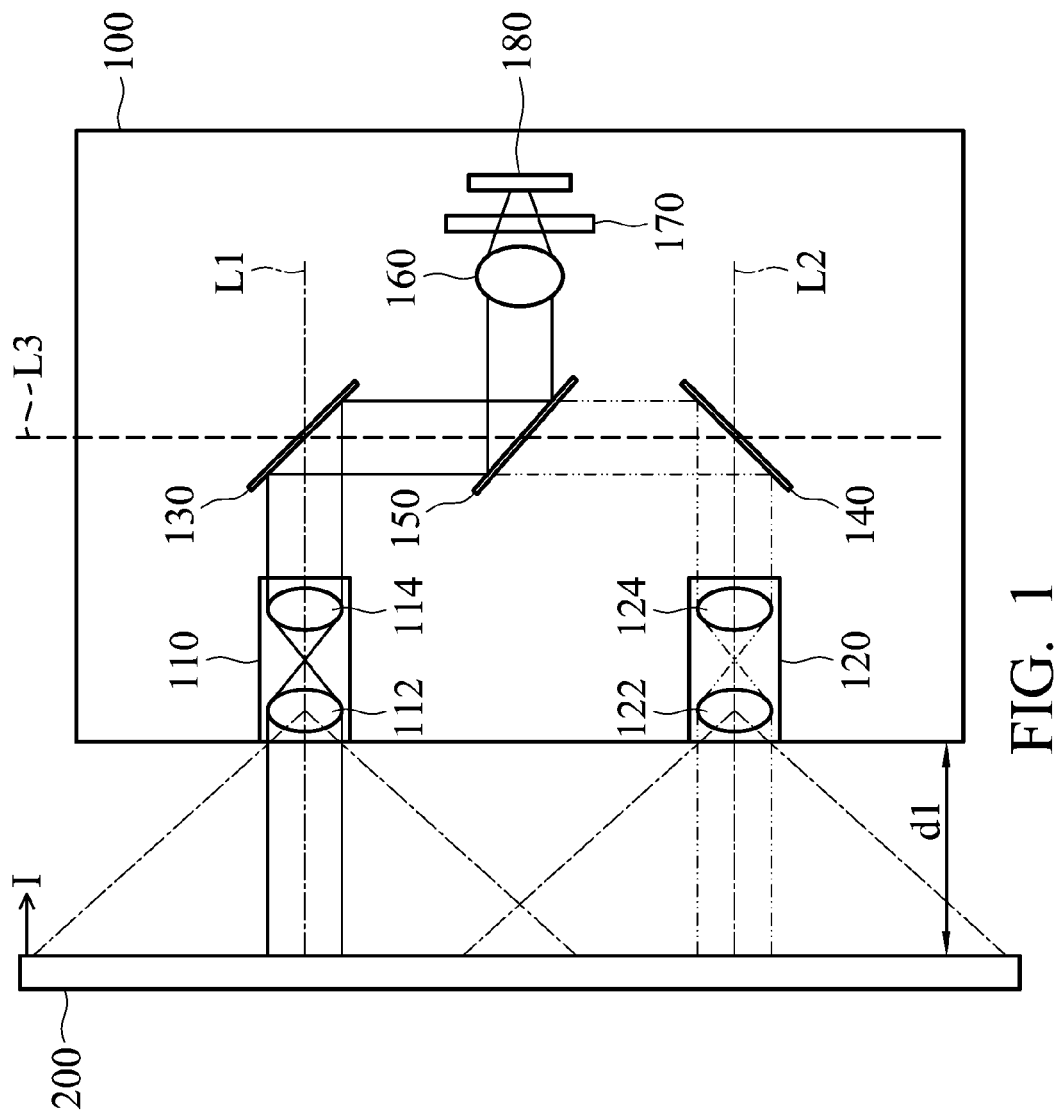
FIG. 1 is a schematic diagram illustrating an embodiment of a display measuring device.

FIG. 1 is a schematic diagram illustrating an embodiment of a display measuring device. In the embodiment of FIG. 1, the display measuring device 100 comprises a lens module 110, a lens module 120, a plane mirror 130, a plane mirror 140, an optic reflecting unit 150, a focus lens 160, a color filter(s) 170 and a photosensitive unit 180. A display 200 outputs images forward to the direction I. The lens module 110 is composed of an image capturing lens 112 and a lens 114. The capturing lens 112 is configured to receive the light/image from the display 200 and project the image to the lens 114, and the lens 114 projects the image to the plane mirror 130, accordingly. Similarly, the lens module 120 is composed of an image capturing lens 122 and a lens 124. The capturing lens 122 is configured to receive the light/image from the display 200 and project the image to the lens 124, and the lens 124 projects the image to the plane mirror 140, accordingly. The lens module 110 and the display 200 are a measuring distance dl apart, and the lens module 120 and the display 200 are also the measuring distance dl apart. Also, the lens 114 and the lens 124 can be an achromatic lens or an aplanat lens. It should be noted that a lens module is composed of an image capturing lens and a lens in the above embodiment, but the invention is not limited thereto, and a lens module can be composed of more than one lens module to perform the same effect.

In some embodiments, in order to simulate the human eyes, the distance between the lens module 110 and the lens module 120 can be set the same as the distance between the human eyes (ex. 65 mm). Also, it should be noted that both the lens module 110 and the lens module 120 are arranged to face the normal line of the display 200 in FIG. 1, but the invention is not limited thereto. Users still can rotate the lens module 110 and the lens module 120 according to different applications.

The plane mirror 130 is arranged behind the lens module 110, and is configured to reflect the image projected by the lens module 110 to the optic reflecting unit 150. Also, the plane mirror 130, the image capturing lens 112 and a lens 114 of the lens module 110 are arranged in a common straight line L1. The plane mirror 140 is arranged behind the lens module 120, and is configured to reflect the image projected by the lens module 120 to the optic reflecting unit 150. Also, the plane mirror 140, the image capturing lens 122 and a lens 124 of the lens module 120 are arranged in a common straight line L2.

The optic reflecting unit 150 is arranged between the plane mirror 130 and the plane mirror 140, and the plane mirror 130, the plane mirror 140 and the optic reflecting unit 150 are arranged in a common straight line L3. In some embodiments, in order to reflect the images projected by the lens module 110 and the lens module 120 after the lens module 110 and the lens module 120 are rotated, the plane mirror 130 and the plane mirror 140 can rotate their reflecting surface and shift along the common straight line L3 according to the rotation of the lens module 110 and the lens module 120. Also, the optic reflecting unit 150 can change the direction of its reflecting surface at different periods of time, so that the images reflected by the plane mirror 130 and the plane mirror 140 can be reflected to the optic reflecting unit 150 at different periods of time, respectively.

The focus lens 160 and the color filter(s) 170 are arranged between the optic reflecting unit 150 and the photosensitive unit 180, and the photosensitive unit 180 is arranged to face the color filter 170. Also, the light/image reflected by the optic reflecting unit 150 passes through the focus lens 160 and the color filter(s) 170, and is projected to the photosensitive unit 180. The focus lens 160 is configured to focus the light/image reflected by the optic reflecting unit 150 on the photosensitive unit 180, and the color filter(s) 170 is configured to filter the light/image reflected by the optic reflecting unit 150 such that the image received by photosensitive unit 180 can be similar to the image seen by human eyes (ex. Color Matching Functions).

The photosensitive unit 180 may be a single point detector, an array detector or a surface detector, and is composed of a CCD or CMOS detector configured to transform the received image into an electrical signal. As the photosensitive unit 180 is a well-known element in the art and not the focal element in the invention, it is not described hereafter. In some embodiments, the focus lens 160 and the color filter 170 can be omitted, and the photosensitive unit 180 can be arranged to face the optic reflecting unit 150 to receive the light/image reflected by the optic reflecting unit 150.

The operation of the display measuring device 100 is described hereafter. The lens module 110 projects parts of the incident image from the display 200 to the plane mirror 130, and the plane mirror 130 reflects the parts of the incident image projected by the lens module 110 to the optic reflecting unit 150. Meanwhile, the lens module 120 projects parts of the incident image from the display 200 to the plane mirror 140, and the plane mirror 140 reflects the parts of the incident image projected by the lens module 120 to the optic reflecting unit 150. The optic reflecting unit 150 rotates to face a first direction during a first period, so that the incident image reflected by the plane mirror 130 can be reflected to the photosensitive unit 180. The optic reflecting unit 150 rotates to face a second direction during a second period, so that the incident image reflected by the plane mirror 140 can be reflected to the photosensitive unit 180. As the optic reflecting unit 150 can change its direction repeatedly, the photosensitive unit 180 obtains the image from the lens module 110 during the first period, and obtains the image from the lens module 120 during the second period. Therefore, luminance and chromaticity of a three dimensional image composed of the two obtained images can be detected. In some embodiments, the frequency of the change in direction of the optic reflecting unit 150 can synchronize with the frequency of the switching between left-eye frame and right-eye frame of the display 200. Also, according to the embodiment, the images of the left-eye frame and right-eye frame from two different lenses can be obtained with one photosensitive unit such that manufacturing costs of the display measuring device is reduced.

In order to simulate the human eyes viewing the display at different distances, the lens module 110 and the lens module 120 may rotate according to the change of measuring distance between the lens modules 110, 120 and display 200. Also, the plane mirror 130 and the plane mirror 140 are rotated and shifted, accordingly. Next, the operation of the display measuring device 100 in different measuring distances is described according to FIG. 2.

Figure 2:
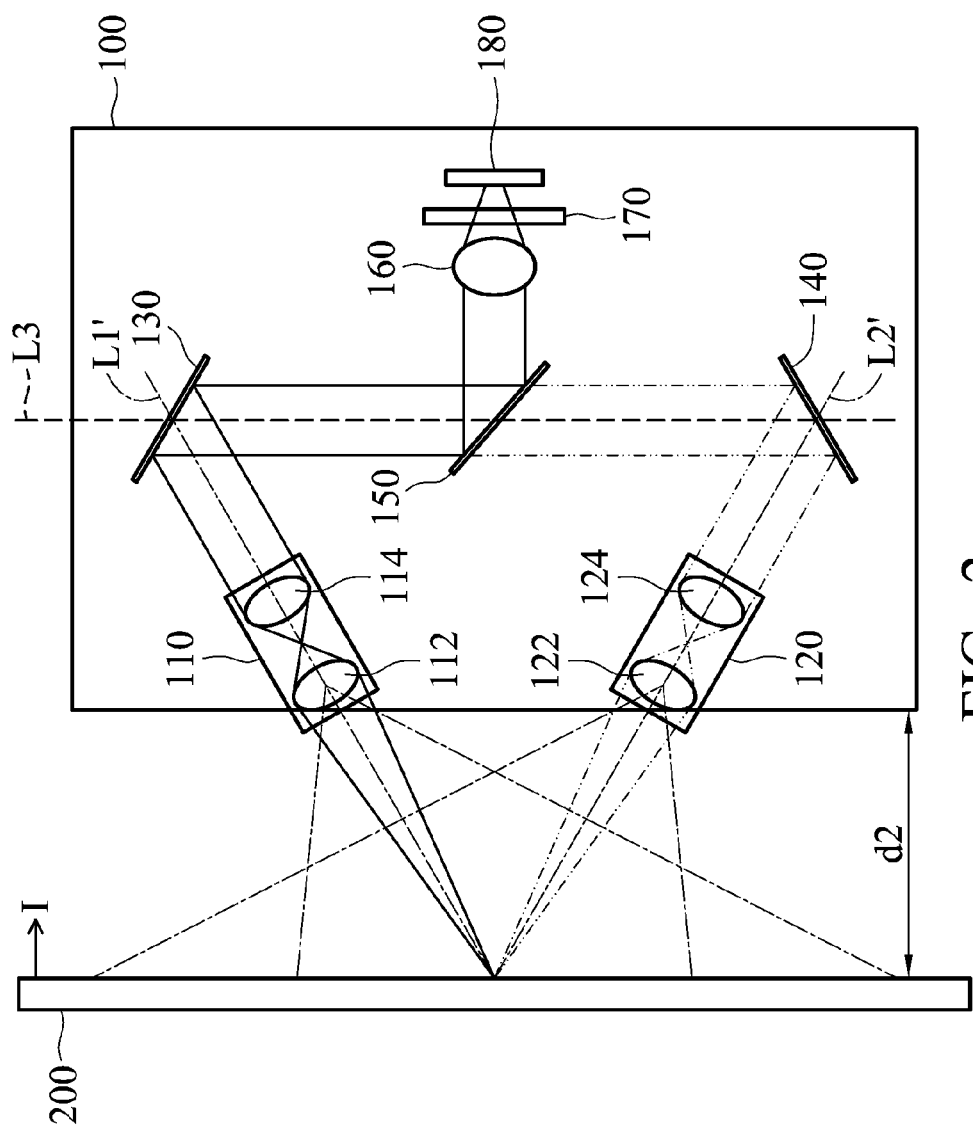
FIG. 2 is a schematic diagram illustrating an embodiment of a display measuring device.

FIG. 2 is a schematic diagram illustrating an embodiment of a display measuring device in the different measuring distance. Different from the embodiment of FIG. 1 simulating the human eyes viewing the display directly, the embodiment of FIG. 2 simulates the image being captured when the human eyes focus on a point of the display. In this embodiment, the lens module 110 and the lens module 120 rotate to face the same point of the display 200, and the plane mirror 130 is shifted along the common straight line L3 to be behind the lens module 110 such that the plane mirror 130, the image capturing lens 112 and a lens 114 of the lens module 110 are arranged in another common straight line L1'. Also, the plane mirror 130 rotates its reflection surface to reflect the image from the lens module 110 to the optic reflecting unit 150. Meanwhile, the plane mirror 140 is shifted along the common straight line L3 to be behind the lens module 120 such that the plane mirror 140, the image capturing lens 122 and a lens 124 of the lens module 120 are arranged in another common straight line L2'. Similarly, the plane mirror 140 rotates its reflection surface to reflect the image from the lens module 120 to the optic reflecting unit 150. Then, the optic reflecting unit 150 changes the direction of its reflection surface so that the images reflected by the plane mirror 130 and the plane mirror 140 can be reflected to the photosensitive unit 180 at different periods of time, which is similar to the embodiment of FIG. 1.

As the measuring distance changes, the rotation angles of the lens module 110 and the lens module 120 change, and the shifted distances of the plane mirror 130 and the plane mirror 140 change. Therefore, the display measuring device 100 can detect images in different measuring distances, and simulate images viewed by the human eyes focusing on a point of the display.

Figure 3:
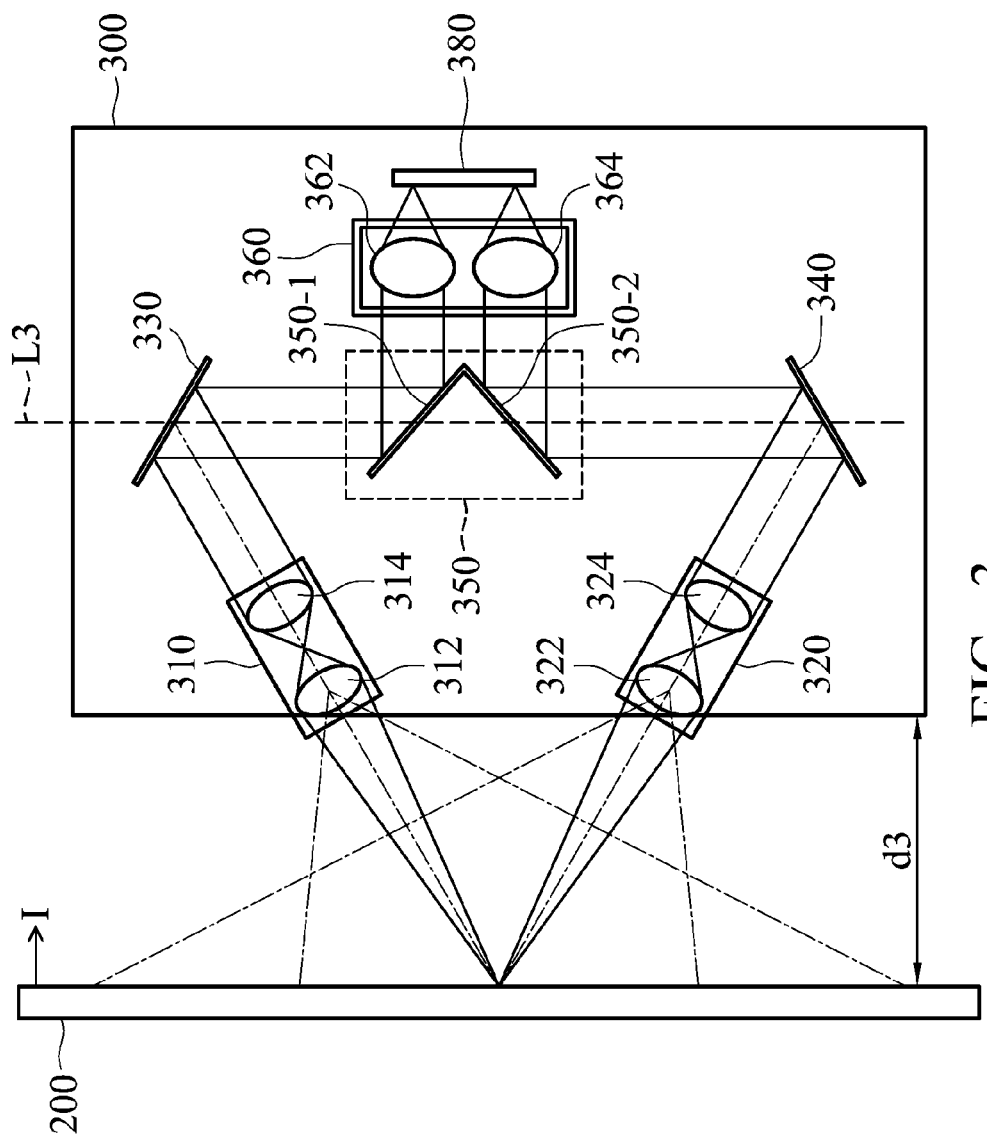
FIG. 3 is a schematic diagram illustrating another embodiment of a display measuring device.

In some embodiments, the optic reflecting unit 150 may have two different reflection surfaces, and the two different reflection surfaces reflect the images from the plane mirror 130 and the plane mirror 140 to the photosensitive unit 180, respectively, as shown in FIG. 3.

FIG. 3 is a schematic diagram illustrating another embodiment of a display measuring device. In the embodiment of FIG. 3, the display measuring device 300 comprises a lens module 310, a lens module 320, a plane mirror 330, a plane mirror 340 and a photosensitive unit 380. A display 200 outputs images forward to the direction I. The lens module 310 is composed of an image capturing lens 312 and a lens 314. The capturing lens 312 is configured to receive the light/image from the display 200 and project the image to the lens 314, and the lens 314 projects the image to the plane mirror 330, accordingly. Similarly, the lens module 320 is composed of an image capturing lens 322 and a lens 324. The capturing lens 322 is configured to receive the light/image from the display 200 and project the image to the lens 324, and the lens 324 projects the image to the plane mirror 340, accordingly. The lens module 310 and the display 200 are a measuring distance d3 apart, and the lens module 320 and the display 200 are also the measuring distance d3 apart. The operation and arrangement of the elements described above in FIG. 3 are similar to those in FIGS. 1 and 2.

However, the display measuring device 300 of FIG. 3 comprises an optic reflecting unit 350 and a lens module 360 so it is different from the embodiments in FIGS. 1 and 2. The optic reflecting unit 350 comprises a fixed plane mirror 350-1 and a fixed plane mirror 350-2, and the lens module 360 comprises a focus lens 362 and a focus lens 364. The fixed plane mirror 350-1 of the optic reflecting unit 350 is configured to reflect the incident image reflected by the plane mirror 330 to the focus lens 362, and the focus lens 362 projects the incident image to the photosensitive unit 380, accordingly. Meanwhile, the fixed plane mirror 350-2 of the optic reflecting unit 350 is configured to reflect the incident image reflected by the plane mirror 340 to the focus lens 364, and the focus lens 364 projects the incident image to the photosensitive unit 380, accordingly. Therefore, two areas of the photosensitive unit 380 obtain the images from the lens modules 310 and 320 respectively, and luminance and chromaticity of a three dimensional image composed of the two obtained images can be detected. Also, in the embodiment, because the photosensitive unit 380 obtains the images captured by the lens modules 310 and 320 from the display 200 at the same time, luminance and chromaticity of the three dimensional image shown by the 3D display without shutter glasses (such as Lenticular lens 3D display or Parallax barrier display) can be measured. In addition, because the images of the left-eye frame and the right-eye frame can be obtained at the same time, a "cross talk" effect can be detected. The "cross talk" effect means that the image is unclear when the display 200 outputs the left-eye frame and the right-eye frame at the same time.

In some embodiments, the focus lens 362 and the focus lens 364 can be omitted, and the photosensitive unit 380 can be arranged to face the optic reflecting unit 350 to receive the lights/images reflected by the fixed plane mirror 350-1 and 350-2. Also, in order to make the image received by the photosensitive unit 380 similar to the image seen by human eyes, a color filter(s) can be arranged between the focus lens 362 and the photosensitive unit 380, and a color filter(s) can be arranged between the focus lens 364 and the photosensitive unit 380. Similarly, in some embodiments, the lens modules 310 and the lens modules 320 can rotate according to the measuring distance of the display 200, and the plane mirror 330 and the plane mirror 340 can also rotate and shift, accordingly.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display measuring device for measuring a display, comprising:
    a photosensitive unit;
    a first rotation plane mirror;
    a second rotation plane mirror;
    a first lens module, projecting a first incident image from the display to the first rotation plane mirror;
    a second lens module, projecting a second incident image from the display to the second rotation plane mirror; and
    an optic reflecting unit, reflecting a third incident image and a fourth incident image to the photosensitive unit,
    wherein the first rotation plane mirror reflects the projected first incident image from the first lens module as the third incident image to the optic reflecting unit, and
    the second rotation plane mirror reflects the projected second incident image from the second lens module as the fourth incident image to the optic reflecting unit.

2. The display measuring device of claim 1, wherein the optic reflecting unit is a third rotation plane mirror, reflecting the third incident image to the photosensitive unit during a first period, and reflecting the fourth incident image to the photosensitive unit during a second period.

3. The display measuring device of claim 1, wherein the optic reflecting unit comprises a first fixed plane mirror configured to reflect the third incident image, and a second fixed plane mirror configured to reflect the fourth incident image.

4. The display measuring device of claim 3, wherein the first fixed plane mirror reflects the third incident image to a first area of the photosensitive unit, and the second fixed plane mirror reflects the fourth incident image to a second area of the photosensitive unit.

5. The display measuring device of claim 1, wherein the first lens module and the display separated by a measuring distance, and the second lens module and the display separated by the measuring distance; and
    wherein the first lens module rotates to a first angle according to the measuring distance, and the second module rotates to a second angle according to the measuring distance.

6. The display measuring device of claim 5, wherein the first rotation plane mirror, the second rotation plane mirror and the third rotation plane mirror are arranged in a common straight line, and
    the first rotation plane mirror shifts a first distance along the common straight line according to the first angle, and the second rotation plane mirror shifts a second distance along the common straight line according to the second angle.

7. The display measuring device of claim 6, wherein the first rotation plane mirror rotates to a third angle according to the first angle and the first distance, and the second rotation plane mirror rotates to a fourth angle according to the second angle and the second distance.

8. The display measuring device of claim 1, further comprising at least one color filter arranged between the optic reflecting unit and the photosensitive unit.

9. The display measuring device of claim 1, wherein the first lens module comprises a first image capturing lens and a first lens, wherein the first incident image is projected to the first rotation plane mirror via the first image capturing lens and the first lens, and wherein the second lens module comprises a second image capturing lens and a second lens, wherein the second incident image is projected to the second rotation plane mirror via the second image capturing lens and the second lens.

10. The display measuring device of claim 1, further comprising a focus lens configured to focus the third incident image and the fourth incident image on the photosensitive unit.

11. The display measuring device of claim 1, wherein the photosensitive unit is a single point detector, an array detector or a surface detector.

* * * * *